United States Patent [19]

Haas

[11] Patent Number: 5,358,020
[45] Date of Patent: Oct. 25, 1994

[54] MOTORCYCLE TIRE WITH NARROW LONGITUDINAL GROOVES

[75] Inventor: Johann Haas, Munich, Fed. Rep. of Germany

[73] Assignee: Metzeler Reifen GmbH, Munich, Fed. Rep. of Germany

[21] Appl. No.: 33,153

[22] Filed: Mar. 16, 1993

[30] Foreign Application Priority Data

Mar. 16, 1992 [DE] Fed. Rep. of Germany ....... 4208391

[51] Int. Cl.$^5$ ............................................. B60C 11/08
[52] U.S. Cl. ................................................ 152/209 R
[58] Field of Search ....................... 152/209 R, 209 D; D12/142–151

[56] References Cited

U.S. PATENT DOCUMENTS

| | | | |
|---|---|---|---|
| D. 287,956 | 1/1987 | Nishio et al. ...................... | D12/147 |
| D. 295,159 | 4/1988 | Mader ................................ | D12/147 |
| 4,606,389 | 8/1986 | Haas ................................... | 152/209 R |

FOREIGN PATENT DOCUMENTS

| | | | |
|---|---|---|---|
| 0368553 | 5/1990 | European Pat. Off. . | |
| 0090703 | 7/1981 | Japan .............................. | 152/209 D |
| 2-133206 | 5/1990 | Japan .............................. | 152/209 R |

*Primary Examiner*—Michael W. Ball
*Assistant Examiner*—Nancy T. Krawczyk
*Attorney, Agent, or Firm*—Herbert L. Lerner; Laurence A. Greenberg

[57] ABSTRACT

A motorcycle tire has a tire body with a running surface and a tire tread. A plurality of main grooves are formed in the tire tread which form a plurality of tread blocks. The main grooves extend at an angle relative to a longitudinal axis of the tire. Three mutually parallel, narrow longitudinal grooves are forme in the tire tread which extend around the tire body. The longitudinal grooves are formed symmetrically about the longitudinal axis and they intersect at least some of the main grooves. The longitudinal grooves have a depth which is approximately 70 to 100% of the main grooves.

6 Claims, 1 Drawing Sheet

MOTORCYCLE TIRE WITH NARROW LONGITUDINAL GROOVES

BACKGROUND OF THE INVENTION

1. Field of the Invention

The invention relates to a motorcycle tire with a tread in which tread grooves are cut transversely or obliquely relative to the circumferential direction and in which the grooves define corresponding profile blocks between them.

2. Description of the Related Art

Conventionally, rolling surfaces or tread surfaces of motorcycle tires were provided with encompassing grooves, the depth of which was approximately equal to their width. Such relatively wide and deep encompassing grooves, however, caused a relatively low leaning stiffness in the tires, so that sufficient driving stability in the high-speed range was no longer assured. Also, a low axial stiffness of the tread resulted, which impaired the transfer of transverse forces between the motorcycle and the road surface.

The conditions were then improved with a tire tread with a strongly transversely oriented tread design, as described in European non-prosecuted, published application EP-A-0 145 009. That tread, however, was still provided with a center groove. The tire of that publication was much superior with respect to the above-described, previously conventional groove treads as concerned their drive stability and force transfer characteristics.

A further step in improving the leaning drive stiffness and the transferability for braking forces and lateral forces was a tread which did not include any encompassing grooves or circumferentially oriented groove segments. That tire is described in brochures of the firm Metzeler Reifen GmbH under the name "ME 1 Front", for instance. In many respects, that tread provides virtually perfect drive characteristics.

There are motorcycles, however, which have a tendency to jitter or shimmy. Such handle jitter is usually due to the frame structure, the geometry and the load distribution. The effect is observed in a velocity range of between 40 and 80 km/h (25–50 mph). Handle jitter is a motorcycle-typical oscillation of the steering system about the steering axis at a frequency of about 7 Hz.

SUMMARY OF THE INVENTION

It is accordingly an object of the invention to provide a motorcycle tire tread pattern, which overcomes the herein-afore-mentioned disadvantages of the heretofore-known products of this general type and which suppresses handle jitter while leaving the force transfer characteristics of the tire unimpaired.

With the foregoing and other objects in view there is provided, in accordance with the invention, a motorcycle tire, which comprises a tire body having a running surface with a tire tread and a longitudinal axis defined in a direction of travel; the tire tread having a plurality of main grooves formed therein extending at an angle relative to the longitudinal axis and defining a plurality of tread blocks; the tire tread having three mutually parallel, narrow longitudinal grooves formed therein extending circumferentially around the tire body; the longitudinal grooves being formed in the running surface symmetrically about the longitudinal axis and intersecting at least some of the main grooves; and the main grooves having a given depth and the longitudinal grooves having a depth being approximately 70 to 100% of the given depth.

The main object of the invention is solved, in accordance with the invention, by providing an encompassing narrow slit or groove in the zenith of the tread and laterally thereof two more narrow slits or grooves, which intersect with or cut into at least some of the plurality of main tread grooves. The depth of the three narrow slits is about 70 to 100% of the depth of the main tread grooves.

In accordance with an added feature of the invention, the longitudinal grooves have a width of no more than 1.5 mm.

In accordance with an additional feature of the invention, the longitudinal grooves are a center groove and two lateral grooves, the two lateral grooves extending parallel to the center groove at a distance of about 10 to 20 mm and, in accordance with a further feature of the invention, preferably about 15 mm.

In accordance with concomitant features of the invention, the main grooves are oriented transversely relative the longitudinal axis or they are oriented obliquely relative the longitudinal axis.

These encompassing narrow grooves, whose width is at a maximum of 1.5 mm, lower the leaning drive coefficient of the tire and therefore oppose the tendency for handle jitter without impairing the required tire characteristics with respect to the transfer of forces. In the region of small leaning angles about the zero position, i.e. in near vertical or only slightly leaning drive positions, the narrow grooves decouple the individual tread ribs. When circumferential and lateral forces occur, these narrow grooves close, so that the individual ribs work like a compact block.

It is particularly advantageous, when the respective distance of the two lateral grooves from the central groove is 10 to 20 mm.

Other features which are considered as characteristic for the invention are set forth in the appended claims.

Although the invention is illustrated and described herein as embodied in a motorcycle tire, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
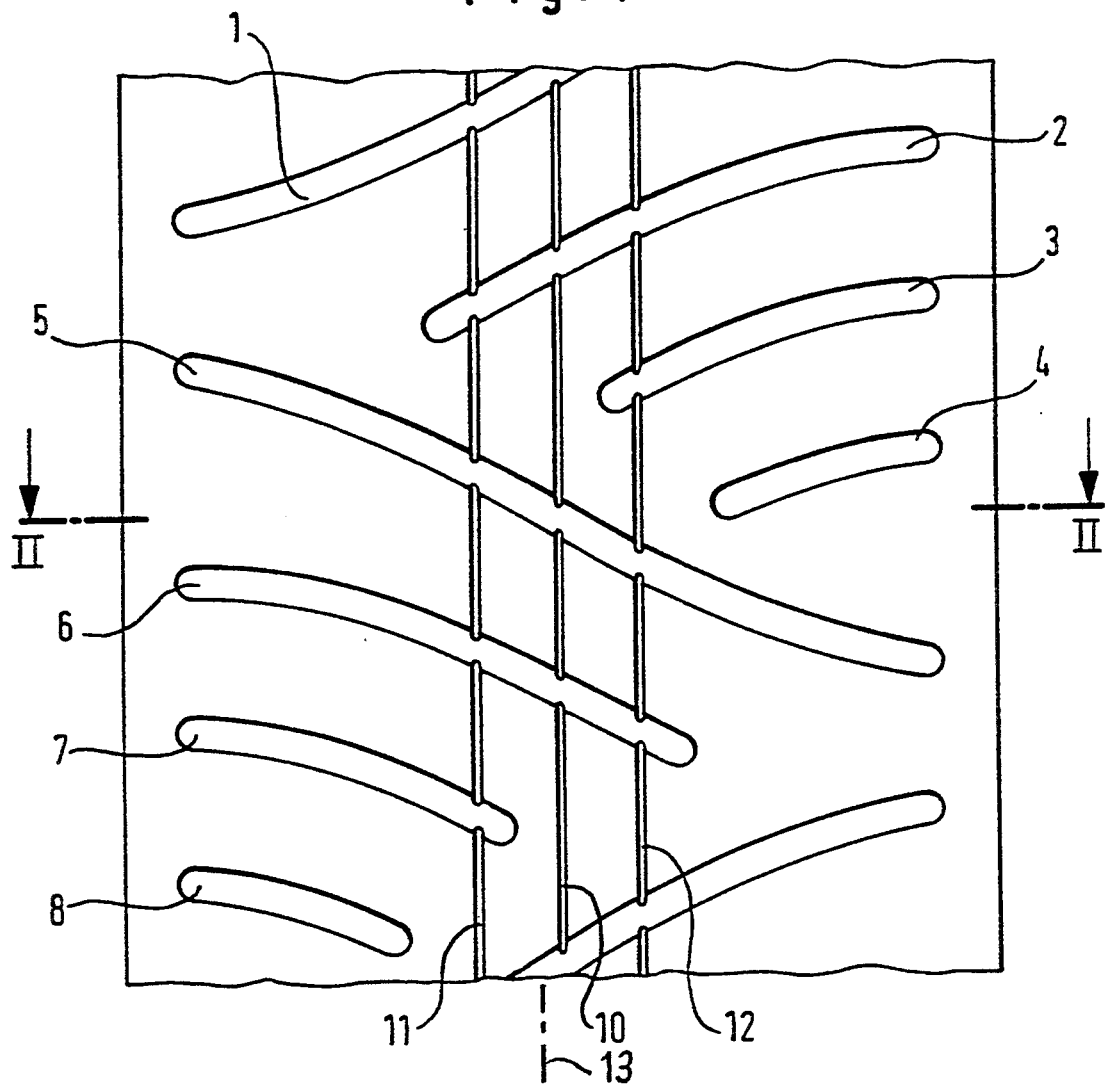
FIG. 1 is a developed top view of two adjacent segments of a tire tread according to the invention.

Referring now to the figures of the drawing in detail and first, particularly, to FIG. 1 thereof, there is seen a sequence of two segments of a tread pattern. Tread grooves 1–8 extend obliquely relative to a direction of travel. The grooves have an angle of incidence which is oriented neither purely longitudinally nor purely transversely. Two groups are provided of the slightly wavy tread grooves. A first group with the grooves 1–4 has an angle of incidence relative to an imaginary center line opposite an angle of incidence of a second group with the grooves 5–8. The two interlaced groups 1–4 and 5–8 are thereby systematically staggered longitudinally, so that even wear results as well as a high degree of curve stability in leaning drive.

Figure 2:
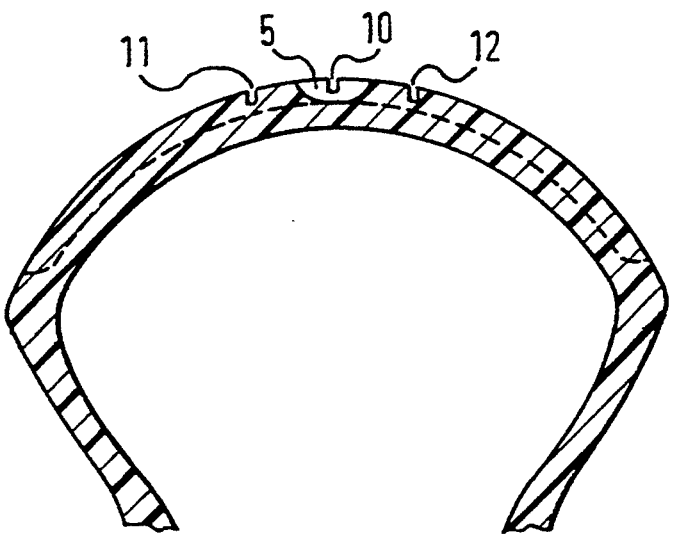
FIG. 2 is a cross-sectional view of the tire tread taken along the line II—II of FIG. 1.

The tire tread with the obliquely oriented tread grooves 1–8 is additionally provided with three narrow grooves 10, 11 and 12. The grooves 10–12 extend around the tire in a longitudinal direction and encompass the entire tire. With reference to the cross-section of FIG. 2, the groove 10 extends along the zenith of the tread and the grooves 11 and 12 are disposed laterally thereof.

The longitudinal grooves 10, 11 and 12 cut or intersect the oblique grooves 1, 2 and 3, as well as 5, 6 and 7, and they have a depth of about 70 to 100% of the depth of the oblique grooves, i.e. they are usually not as deep as the oblique grooves. The width of the longitudinally encompassing grooves 10, 11 and 12 is no more than 1.5 mm.

If, by way of example, the depth of the main, oblique grooves 1–8 is about 4 mm and their width is 6 mm, the depth of the longitudinal grooves would then be about 3 mm and their width would be 1 mm.

Furthermore, the distance of the lateral grooves 11 and 12 from the central groove 10 should be about 10 to 20 mm, and preferably 15 mm.

Due to the additional narrow grooves 10, 11 and 12, the leaning drive coefficient of the tire is lowered, so that the tendency of handle jitter is overted without impairing the force transfer characteristics.

At small leaning angles about the zero position, i.e. in the near vertical driving position, the longitudinal grooves 10, 11 and 12 decouple the individual tread ribs which they define together with the oblique grooves 1–8. Due to the very small width of the longitudinal grooves 10, 11 and 12, however, they close when circumferential forces and lateral forces act upon them, so that the individual ribs disposed between the longitudinal grooves 10–12 work like a continuous compact block and absorb the corresponding forces.

A longitudinal axis of the tire body is shown in the dash-dotted line 13.

As mentioned above, the invention has been described herein only in the context of a relatively narrow exemplary embodiment, i.e. with a special oblique-groove tread. This, however, is only a specific exemplary embodiment, since the invention may also be employed with different groove configurations without exact longitudinal or tranverse orientation.

I claim:

1. A motorcycle tire, comprising:
a tire body having a running surface with a tire tread and a longitudinal axis defined in a direction of travel;
said tire tread having a plurality of main grooves formed therein extending at an angle relative to the longitudinal axis and defining a plurality of tread blocks;
said tire tread having three mutually parallel, longitudinal grooves formed therein extending circumferentially around said tire body, said longitudinal grooves being narrower than said main grooves;
said longitudinal grooves being formed in said running surface symmetrically about the longitudinal axis and each of said longitudinal grooves intersecting at least some of said main grooves; and
said main grooves having a given depth and said longitudinal grooves having a depth being smaller than said given depth.

2. The motorcycle tire according to claim 1, wherein said longitudinal grooves have a width of no more than 1.5 mm.

3. The motorcycle tire according to claim 1, wherein said longitudinal grooves are a center groove and two lateral grooves, said two lateral grooves extending parallel to said center groove at a distance of about 10 to 20 mm.

4. The motorcycle tire according to claim 3, wherein the distance is substantially 15 mm.

5. The motorcycle tire according to claim 1, wherein said main grooves are oriented transversely relative the longitudinal axis.

6. The motorcycle tire according to claim 1, wherein said main grooves are oriented obliquely relative the longitudinal axis.

* * * * *